(12) United States Patent
Li

(10) Patent No.: US 11,401,110 B2
(45) Date of Patent: Aug. 2, 2022

(54) MOBILE ROBOT

(71) Applicant: BEIJING GEEKPLUS TECHNOLOGY CO. LTD, Beijing (CN)

(72) Inventor: Hongbo Li, Beijing (CN)

(73) Assignee: Beijing Geekplus Technology Co. Ltd, Beijing (CN)

( * ) Notice: Subject to any disclaimer, the term of this patent is extended or adjusted under 35 U.S.C. 154(b) by 258 days.

(21) Appl. No.: 16/607,840

(22) PCT Filed: Apr. 24, 2019

(86) PCT No.: PCT/CN2019/084072
§ 371 (c)(1),
(2) Date: Oct. 24, 2019

(87) PCT Pub. No.: WO2019/233207
PCT Pub. Date: Dec. 12, 2019

(65) Prior Publication Data
US 2021/0070546 A1 Mar. 11, 2021

(30) Foreign Application Priority Data
Jun. 6, 2018 (CN) .......................... 201810577788.0

(51) Int. Cl.
*B65G 1/06* (2006.01)
*B65G 1/04* (2006.01)
(Continued)

(52) U.S. Cl.
CPC .............. *B65G 1/065* (2013.01); *B07C 3/008* (2013.01); *B07C 3/02* (2013.01); *B07C 3/18* (2013.01);
(Continued)

(58) Field of Classification Search
CPC ....... B65G 1/0492; B65G 1/065; B66F 9/063; G05B 19/41895
See application file for complete search history.

(56) References Cited

U.S. PATENT DOCUMENTS 9,457,970 B1 10/2016 Zevenbergen et al.
10,048,697 B1 * 8/2018 Theobald ............. G05D 1/0088
(Continued)

FOREIGN PATENT DOCUMENTS

CN 106564401 B 4/2017
CN 206536457 U 10/2017
(Continued)

OTHER PUBLICATIONS

International Search Report for the related PCT International Application No. PCT/CN2019/084072.
(Continued)

*Primary Examiner* — Thomas Randazzo
(74) *Attorney, Agent, or Firm* — Woods Oviatt Gilman LLP; Katherine H. McGuire, Esq.

(57) ABSTRACT

Provided herein is a mobile robot including: a first carrying device configured to carry a first item; a second carrying device configured to carry a second item; a control device connected to the first driving device and the second driving device and configured to control operation of the first driving device and the second driving device; the first driving device configured to drive, under control of the control device, the mobile robot to travel along a delivery path matching routings of the first item and the second item; and the second driving device, connected to the first carrying device and the second carrying device and configured to drive, under the control of the control device, the first carrying device to deliver the first item and the second carrying device to deliver the second item.

19 Claims, 4 Drawing Sheets

(51) Int. Cl.
*B07C 3/00* (2006.01)
*G05B 19/418* (2006.01)
*G06Q 10/04* (2012.01)
*B07C 3/02* (2006.01)
*B65G 1/137* (2006.01)
*B66F 9/06* (2006.01)
*B66F 9/075* (2006.01)
*B66F 9/12* (2006.01)
*B66F 9/19* (2006.01)
*G05B 19/4155* (2006.01)
*G06Q 10/06* (2012.01)
*G06Q 50/28* (2012.01)
*B07C 3/18* (2006.01)
*G06K 7/10* (2006.01)
*G06K 7/14* (2006.01)
*G06K 19/06* (2006.01)
*G06K 19/07* (2006.01)

(52) U.S. Cl.
CPC ......... *B65G 1/0492* (2013.01); *B65G 1/1371* (2013.01); *B66F 9/063* (2013.01); *B66F 9/0755* (2013.01); *B66F 9/12* (2013.01); *B66F 9/195* (2013.01); *G05B 19/4155* (2013.01); *G05B 19/41895* (2013.01); *G06Q 10/047* (2013.01); *G06Q 10/06315* (2013.01); *G06Q 50/28* (2013.01); *G05B 2219/50391* (2013.01); *G05D 2201/0216* (2013.01); *G06K 7/10297* (2013.01); *G06K 7/1417* (2013.01); *G06K 19/06037* (2013.01); *G06K 19/0723* (2013.01); *G06K 2007/10504* (2013.01)

(56) References Cited

U.S. PATENT DOCUMENTS

| | | | |
|---|---|---|---|
| 10,209,682 | B1* | 2/2019 | Hebert ................. G05D 1/0234 |
| 10,406,693 | B2 | 9/2019 | Shen et al. |
| 10,689,194 | B2* | 6/2020 | Borders ................. B65G 67/02 |
| 2015/0142249 | A1* | 5/2015 | Ooga ..................... B66F 9/063 901/1 |
| 2016/0167888 | A1* | 6/2016 | Messina ............... B65G 41/008 198/315 |
| 2017/0158431 | A1* | 6/2017 | Hamilton ......... G05B 19/41895 |
| 2017/0174432 | A1* | 6/2017 | Zhu ..................... B65G 1/0492 |
| 2018/0265297 | A1* | 9/2018 | Nakano .................. B66F 9/06 |
| 2019/0225285 | A1* | 7/2019 | Packeiser ................ F41H 7/005 |
| 2019/0291956 | A1* | 9/2019 | Pajevic ................. G05D 1/0227 |
| 2019/0302787 | A1* | 10/2019 | Li ....................... G06Q 10/0832 |
| 2020/0339349 | A1* | 10/2020 | Frissenbichler ....... B65G 1/065 |
| 2020/0346251 | A1* | 11/2020 | Ma ..................... B65G 47/5104 |
| 2021/0114062 | A1* | 4/2021 | Liu ................... G05B 19/41895 |

FOREIGN PATENT DOCUMENTS

| | | |
|---|---|---|
| CN | 107352205 A | 11/2017 |
| CN | 107899958 A | 4/2018 |
| CN | 108107862 A | 6/2018 |
| CN | 108500949 A | 9/2018 |
| CN | 208358791 U | 1/2019 |
| JP | 1996108391 A | 4/1996 |
| JP | 2000042951 A | 2/2000 |
| JP | 2001019150 A | 1/2001 |

OTHER PUBLICATIONS

First Office Action for the Japanese related Application No. JP2019-559025.

* cited by examiner

MOBILE ROBOT

The present application is the national phase of International Application No. PCT/CN2019/084072, titled "Mobile Robot", which claims priority to Chinese Patent Application No. 201810577788.0, filed with SIPO on Jun. 6, 2018, both of which are incorporated herein by reference in their entirety.

FIELD OF THE TECHNOLOGY

The present disclosure relates to the field of intelligent logistics technology, for example to mobile robots.

BACKGROUND OF THE DISCLOSURE

Along with the development of e-commerce, new retail models are constantly emerging, and people's shopping concepts are constantly changing. More and more attention is paid to consumption experiences, and timeliness plays a vital role in user experience.

As an important part in supporting consumption services, warehousing services play a vital role in the timeliness of goods. Logistics companies are looking for ways to speed up the throughput of warehouses to improve the timeliness of goods and reduce the transit time of goods. The mainstream intelligent warehousing solutions mainly include automated stereoscopic warehouse solution and intelligent warehousing robot solution. Both solutions adopt the form of "goods to person" in which goods are directly conveyed to pickers. The automated stereoscopic warehouse has high goods-picking efficiency and high throughput, but the construction and maintenance costs are high and the use is inflexible. The intelligent warehousing robot is not as efficient as the automated stereoscopic warehouse in goods-picking, but it is flexible in use, low in investment cost, relatively high in output-input ratio, and flexible in operation and maintenance.

The intelligent warehousing robot solution has been widely popularized. The robot usually has a carrying device (for example, a flap, a conveyor belt) to receive and transport the items to be conveyed. After reaching the designated destination, the items to be conveyed are sent to a specific accommodating container by the carrying device. The carrying device on the robot can only deliver one item at a time, and the delivery efficiency is low.

SUMMARY

The present disclosure provides a mobile robot having multiple carrying devices, which solves the problem of low delivery efficiency of mobile robots existing in the prior art.

The present disclosure provides a mobile robot including:

a first carrying device configured to carry a first item;

a second carrying device configured to carry a second item;

a control device, where the control device is connected to a first driving device and a second driving device and configured to control the first driving device and the second driving device to operate;

the first driving device configured to drive, under control of the control device, the mobile robot to travel along a delivery path matching routings of the first item and the second item; and the second driving device, connected to the first carrying device and the second carrying device and configured to drive, under the control of the control device, the first carrying device to deliver the first item and the second carrying device to deliver the second item.

The mobile robot provided in the present disclosure can deliver multiple items at a time by providing the first carrying device and the second carrying device on the robot, thereby improving the efficiency in the delivery of items.

DESCRIPTION OF EMBODIMENTS

The disclosure will be described below in conjunction with the drawings.

It should be understood that the described embodiments are only some of the embodiments of the present disclosure but not all the embodiments.

Figure 1A:
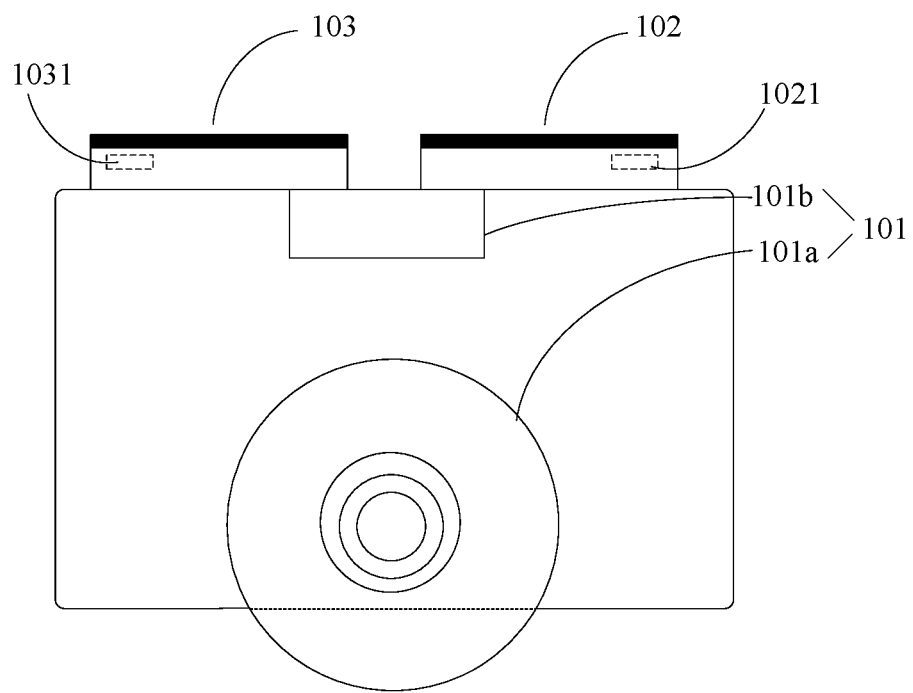
FIG. 1a is a schematic structural diagram of a mobile robot provided according to an embodiment.

Referring to FIG. 1a, the present embodiment provides a mobile robot including a first carrying device 102, a second carrying device 103, and a driving device 101.

The first carrying device 102 is provided on an upper portion of the mobile robot, and is configured to carry a first item to be delivered. The first carrying device 102 can be in various carrying modes. For example, the first carrying device 102 can be a conveyor belt, a flap, or a transit box. The form of the first carrying device 102 is not limited herein.

An item with a designated destination is to be placed on the first carrying device 102. For this purpose, the first carrying device 102 is provided with a first identifier 1021. The first identifier 1021 may be any type of marker with the function of marking, for example, the first identifier 1021 can be a two-dimensional code, radio frequency identification (RFID) tag, or the like. The first identifier 1021 is represented as a unique identifier (ID) to which user can bind the item to be delivered.

Before the system assigns items to the mobile robot, each item to be assigned has specific attribute information, including but not limited to: weight, type (for example, fresh food, fragile item, etc.), routing information of the item (for example, Beijing, Shanghai, etc.), the item ID, and the like. The system for distributing the items automatically assigns corresponding mobile robots and the corresponding carrying devices on the mobile robots. In an embodiment, the first carrying device 102 is configured to carry a first item that matches the first identifier 1021 (there is a binding relationship).

A common mobile robot has only one carrying device, for which the delivery efficiency is low and the corresponding energy consumption is also increased. In view of this, the mobile robot of the present disclosure is provided with a second carrying device 103 configured to carry a second item. The second carrying device 103 has a second identifier 1031, and the second carrying device 103 is configured to carry a second item that matches the second identifier 1031 (there is binding relationship).

The second carrying device 103 is provided on the upper portion of the mobile robot, and is arranged to carry the second item to be delivered. The second carrying device 103 may be in various carrying modes. For example, the second carrying device 103 can be a conveyor belt, a flap, or a transit box. The form of the second carrying device 103 is not limited herein.

An item having a designated destination is to be placed on the second carrying device 103. For this purpose, the second identifier 1031 is provided on the second carrying device 103. The second identifier 1031 may be any type of marker with the function of marking, for example, the second identifier 1031 may be a two-dimensional code, an RFID tag, or the like. The second identifier 1031 is represented as a unique ID to which the user can bind the item to be delivered.

Before the system assigns items to the mobile robot, each item to be assigned has specific attribute information, including but not limited to: weight, type (for example, fresh food, fragile item, etc.), routing information of the item (for example, Beijing, Shanghai, etc.), the item ID, and the like. The system for distributing the items automatically assigns corresponding mobile robots and the corresponding carrying devices on the mobile robots. In this embodiment, the second carrying device 103 is configured to carry a second item that matches the second identifier 1031.

The driving device 101 includes a first driving device 101*a* that drives the mobile robot to advance, and a second driving device 101*b* that drives the first carrying device 102 and the second carrying device 103 to deliver items. The second driving device 101*b* is connected to the first carrying device 102 and the second carrying device 103.

It will be understood that the mobile robot further includes a control device (not shown in FIG. 1*a*). The control device is connected to the first drive device 101*a* and the second drive device 101*b*, and is configured to control the operation of the drive device 101*a* and the drive device 101*b*.

After the first item and the second item are placed on the mobile robot, the routing information of the first item and the second item is read by a server (for example, the first item and the second item are respectively pasted or attached with sheets having markers such as two-dimensional codes, the two-dimensional codes carrying corresponding routing information; the mobile robot carries the first item and the second item, and passes through underneath a scanner keeping the sheets facing up to the scanner; the scanner, when being passed through, scans the two-dimensional code markers on the sheets to read the routing information and send the routing information to the server), and the server sets a corresponding delivery path according to the routing information of the first item and the second item. The server sends the set delivery path to the control device of the mobile robot, and the control device controls the first driving device 101*a* such that the first driving device 101*a* drives the mobile robot to travel along the delivery path matching with the routing of the first item and the second item.

Alternatively, after the first item and the second item are placed on the mobile robot, the routing information of the first item and the second item is read by the mobile robot (for example, the mobile robot is provided with a scanning device such as an RFID reader or the like, and the first item and the second item are respectively pasted or attached with markers such as RFID tags or the like where the RFID tags carry corresponding routing information; when the first item and the second item are placed on the mobile robot, the RFID tags pasted or attached to the items are read by the RFID reader on the mobile robot, and the corresponding routing information is obtained), and the mobile robot sets the corresponding delivery path according to the routing information of the first item and the second item on its own and uploads the set delivery path to the server for review. The server sends the reviewed delivery path to the mobile robot, and the mobile robot controls the first driving device 101*a* such that the first driving device 101*a* drives the mobile robot to travel along the delivery path matching with the destinations of the first item and the second item.

As another alternative, after reading the routing information, the mobile robot may send the routing information to the server, and the server sets a corresponding delivery path according to the routing information of the first item and the second item. The server sends the set delivery path to the control device of the mobile robot, and the control device controls the first driving device 101*a* such that the first driving device 101*a* drives the mobile robot to travel along the delivery path matching with the routing of the first item and the second item.

Figure 1B:
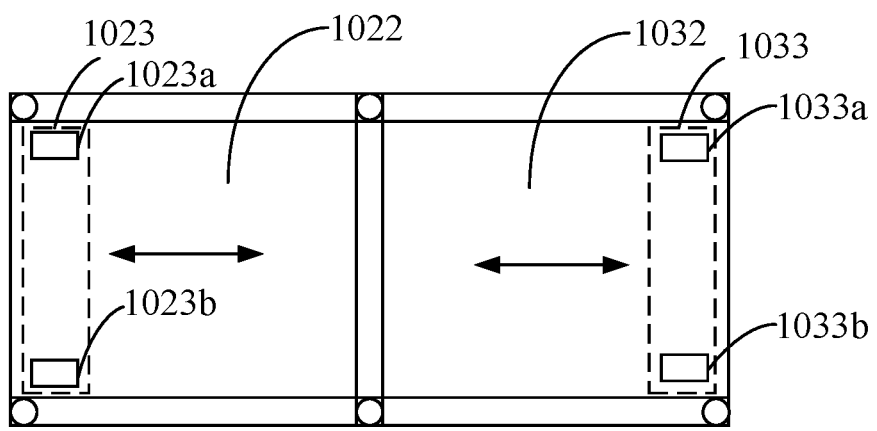
FIG. 1b is a top view of a dual-belt structure provided according to an embodiment.

The first carrying device 102 and the second carrying device 103 can be arranged in various manners. In an embodiment, referring to FIG. 1*a*, the first carrying device 102 and the second carrying device 103 are horizontally arranged. Taking the case in which the carrying device is a belt as an example, as shown in FIG. 1*b*, the first belt 1022 and the second belt 1032 are horizontally arranged on left and right, and the arrows indicate the directions in which the belts can move, i.e., moving left and right; as shown in FIG. 1*c*, the first belt 1022 and the second belt 1032 are horizontally arranged on front and back, and arrows indicate the directions in which the belts can move.

Figure 2:
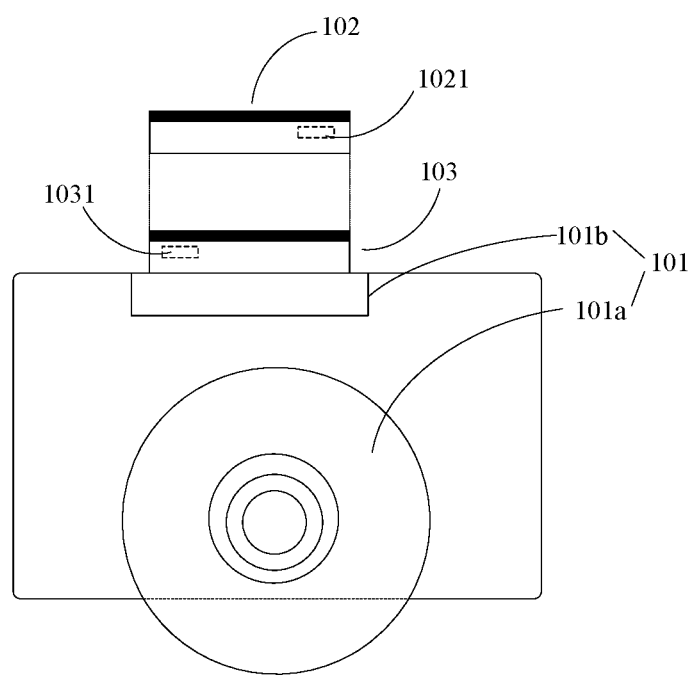
FIG. 2 is a schematic structural diagram of another mobile robot provided according to an embodiment.

In an embodiment, other than the horizontal arrangement, referring to FIG. 2, the first carrying device 102 and the second carrying device 103 are vertically arranged.

For controlling the two carrying devices to deliver the respective items, the first carrying device 102 and the second carrying device 103 may be provided with identifiers to establish a correspondence between the two carrying devices and the carried items. In addition to providing identifiers to the two carrying devices, it is also possible to achieve the correspondence between the carrying devices and the items carried thereon by way of sensors. In one implementation, as shown in FIG. 1*b*, the first carrying device 102 and the second carrying device 103 are horizontally arranged on left and right, and thru-beam sensors 1023 and 1033 are respectively provided on the first carrying device 102 and the second carrying device 103 and are both connected to the control device (not shown in FIG. 1*b*). Each of the thru-beam sensors includes a transmitting end and a receiving end. As shown in FIG. 1*b*, the thru-beam sensor 1023 includes transmitting ends 1023*a* and 1023*b*, and the thru-beam sensor 1033 includes transmitting ends 1033*a* and 1033*b*. When a first item is placed on the first carrying device 102, the first item blocks the signal transmitted between the transmitting end 1023*a* and the receiving end 1023*b* while does not block the signal transmitted between 1033*a* and 1033*b*. The thru-beam sensor 1023 detects change of the signal; the mobile robot reports the detection result to the server; and the server may determine, based on the detection result, that the first item is placed on the first carrying device 102. When the first item needs to be delivered, the server can remotely control the mobile robot to only drive the first carrying device 102 to deliver the first item. Moreover, when the first carrying device 102 delivers the first item, the thru-beam sensor 1023 can also detect the change of the signal, the mobile robot reports the detection result to the server, and the server can further verify, according to the detection result, whether the first carrying device 102 successfully delivers the first item. The second carrying device 103 operates similarly.

Figure 1C:
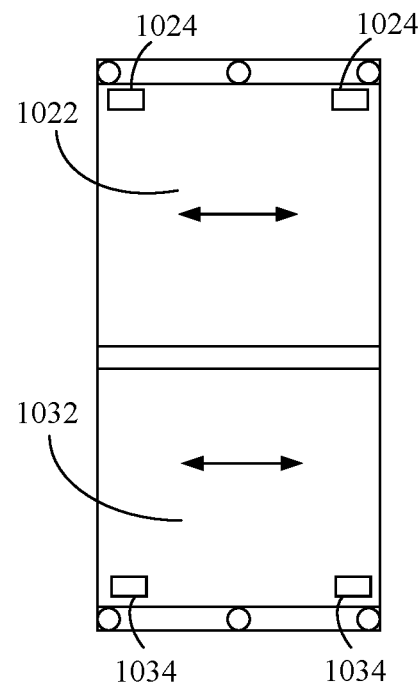
FIG. 1c is a top view of another dual-belt structure provided according to an embodiment.

In another implementation, as shown in FIG. 1c, the first carrying device 102 and the second carrying device 103 are horizontally arranged on front and back, and diffuse reflection sensors 1024 and 1034 are respectively provided on the first carrying device 102 and the second carrying device 103 and are both connected to the control device (not shown in FIG. 1c). Each diffuse reflection sensor includes a transmitting end. As shown in FIG. 1c, the diffuse reflection sensor 1024 includes a transmitting end, and the diffuse reflection sensor 1034 includes a transmitting end. When a first item is placed on the first carrying device 102, a signal transmitted from the transmitting end is reflected by the first item, and the reflected signal is weaker in strength than the transmitted signal. The diffuse reflection sensor detects the change in signal strength; the mobile robot reports the detection result to the server; and the server can determine, based on the detection result, that the first item is placed on the first carrying device 102. Moreover, when the first carrying device 102 delivers the first item, the diffuse reflection sensor 1024 can also detect the change of the signal strength, the mobile robot reports the detection result to the server, and the server can further verify, according to the detection result, whether the first carrying device 102 successfully delivers the first item. The second carrying device 103 operates similarly.

Figure 3:
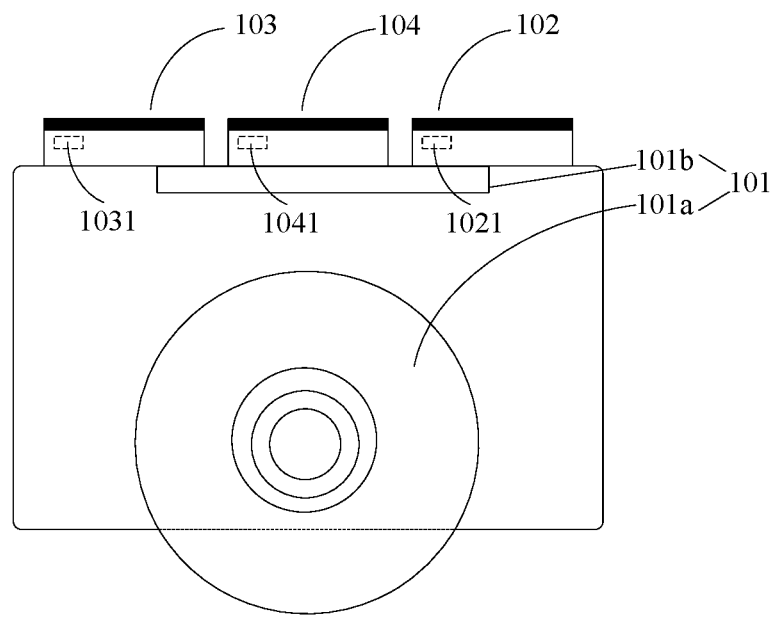
FIG. 3 is a schematic structural diagram of another mobile robot provided according to an embodiment.
Figure 4:
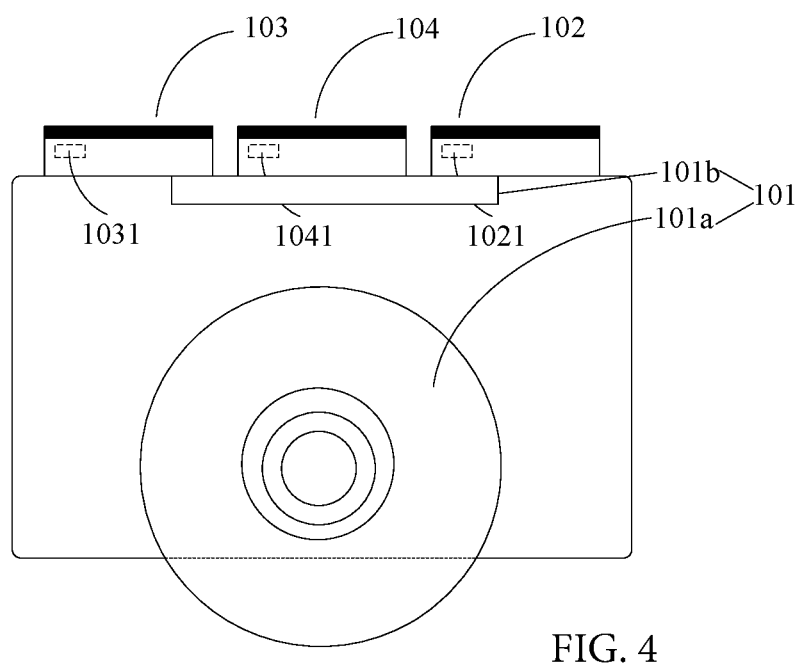
FIG. 4 is a schematic structural diagram of another mobile robot provided according to an embodiment.

Multiple carrying devices may be provided according to type and size of the items to be transit. In an embodiment, referring to FIG. 3 and FIG. 4, the mobile robot further includes: a third carrying device 104 configured to carry a third item. In an embodiment, the third carrying device 104 has a third identifier 1041 and the third carrying device 104 is configured to carry the third item that matches the third identifier 1041. The first driving device 101a drives, under control of the control device, the mobile robot to travel along a delivery path matching the routing of the first item, the second item, and the third item; and the second driving device 101b is further connected to the third carrying device 104, and drives, under control of the control device, the third carrying device 104 to deliver the third item.

The third carrying device 104 may be provided on an upper portion or other position of the mobile robot, and is arranged to carry the third item to be delivered. The third carrying device 104 may be in various carrying modes. For example, the third carrying device 104 may be a conveyor belt, a flap, or a transit box. The form of the third carrying device 104 is not limited herein.

An item having designated routing is to be placed on the third carrying device 104. For this purpose, the third carrying device 104 is provided with a third identifier 1041. The third identifier 1041 may be any type of marker with the function of marking, for example, the third identifier 1041 can be a two-dimensional code, RFID tag, or the like. The third identifier 1041 is represented as a unique identifier (ID) to which user can bind the item to be delivered.

Before the system assigns items to the mobile robot, each item to be assigned has specific attribute information, including but not limited to: weight, type (for example, fresh food, fragile item, etc.), routing information of the item (for example, Beijing, Shanghai, etc.), the item ID, and the like.

The system for distributing the items automatically assigns corresponding mobile robots and the corresponding carrying devices on the mobile robots. In this embodiment, the third carrying device 104 is configured to carry a third item that matches the third identifier 1041 (there is a binding relationship).

In an embodiment, the first carrying device 102, the second carrying device 103, and the third carrying device 104 are sequentially arranged horizontally or sequentially arranged vertically.

When the system needs to deliver a large item, the large item may be placed on the first carrying device 102 and the second carrying device 103. In an embodiment, the first item and the second item refer to a same item. In an embodiment, the first item, the second item, and the third item refer to a same item.

The first carrying device 102, the second carrying device 103, and the third carrying device 104 may be any device having carrying function. In an embodiment, each of the first carrying device 102, the second carrying device 103, and the third carrying device 104 is any one of a conveyor belt and a tray.

In an embodiment, when there are multiple items on the mobile robot, in addition to acquiring the moving path from the server controlling the mobile robot, the mobile robot may further calculate an optimal delivery path according to the routing of the first and the second items on its own. The delivery efficiency of the mobile robot can be improved in this way. In an alternative implementation, the server may calculate an optimal delivery path according to the routing of the first item and the second item, where the mobile robot reads the routing information of the first item and the second item and reports the routing information to the server, or the scanner reads the routing information and sends the routing information to the server, so that the server obtains the routing information of the items and performs path planning based on the routing information.

In an embodiment, the mobile robot further includes a communication device (not shown in FIG. 1a). The communication device is connected with the control device, and is configured to receive the delivery path from the server and to transmit the delivery path to the control device. The control device is configured to control the first drive device 101a according to the delivery path such that the drive device 101a drives the mobile robot to travel along the delivery path.

The length of the path traveled by the mobile robot will directly affect the time for the mobile robot to complete the delivery and further determine the delivery efficiency of the mobile robot. In an embodiment, the mobile robot returns to a target sorting spot after delivering the item, for example, to a sorting spot closest to the mobile robot. In this arrangement, it can be ensured that the moving path of the mobile robot is the shortest.

In an embodiment, the communication device is further configured to receive a return path from the server after the mobile robot delivers the item, and transmit the return path to the control device; the control device is further configured to control the first driving device 101a according to the return path, such that the first driving device 101a drives the mobile robot to return along the return path to the sorting spot closest to the mobile robot.

In addition, the mobile robot may further obtain item delivery information from the server, and then obtain information about item delivery demand for different sorting spots. In an embodiment, for purpose of optimizing overall item delivery amount, the mobile robot returns to the sorting spot with the largest item delivery demand after the item is delivered.

In another embodiment, the communication device is further configured to receive a return path sent by the server after the mobile robot delivers the item, and transmit the return path to the control device; the control device is further configured to control the driving device 101a according to the return path, such that the driving device 101a drives the mobile robot to return along the return path to the sorting spot with the largest item delivery demand.

The closer the destination of the delivered items on the carrying devices are, the higher the coincidence degree for the paths on which the mobile robot transporting the items will be, and the higher the delivery efficiency of the mobile robot will be. In an embodiment, the second carrying device is configured to, upon the first carrying device 102 receives the first item, carry on the second carrying device 103 a second item for which the routing corresponds to a receiving container closest to the receiving container corresponding to the routing of the first item.

In the mobile robot provided in this embodiment, by providing the first carrying device 102 and the second carrying device 103 on the mobile robot, the mobile robot can deliver multiple items at a time, thereby improving the efficiency of item delivery. Moreover, the first identifier 1021 and the second identifier 1031 are provided on the first carrying device and the second carrying device, and the items matching the first identifier 1021 and the second identifier 1031 can be placed on the carrying devices, therefore different items may be identified differently for achieving convenient identifying of different items and preventing confusion in delivery of the items. Finally, by planning a path that matches the routing of the first item and the second item, the overall path for items delivery is shortened, thereby improving the delivery efficiency of the robot.

Figure 5:
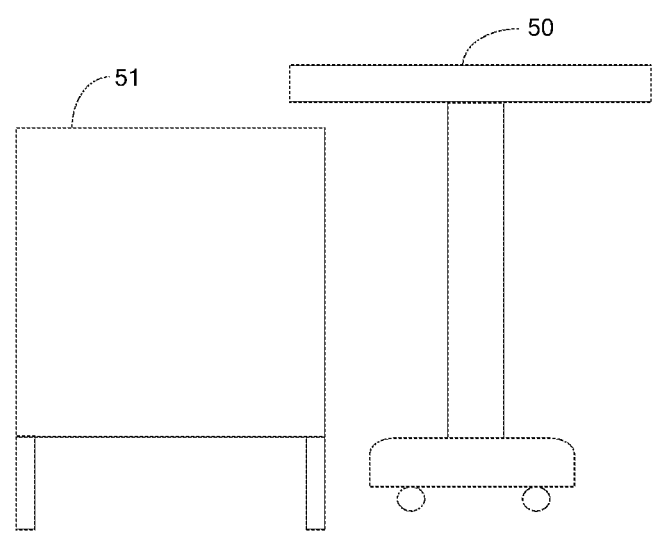
FIG. 5 is a schematic diagram showing a mobile robot docking with an accommodating container provided according to an embodiment.

The mobile robot with multiple carrying devices provided in the embodiments of the present application is suitable for the scenarios of item sorting. For example, the mobile robot may be used in the scenario of flexible floor-standing sorting, as well as in traditional scenario of steel platform sorting. In the scenario of flexible floor-standing sorting, a receiving container (e.g., a trolley) for receiving items (such as parcels) has a bound routing, i.e., one receiving container carries only parcel(s) with particular routing; and the mobile robot and the receiving container are all on the ground. As shown in FIG. 5, the distance from an upper surface of the carrying device 50 on the mobile robot to the ground is greater than or equal to the distance from the upper surface of the receiving container 51 to the ground, so that when the mobile robot moves to a certain receiving container, a parcel is delivered to the receiving container by the carrying device.

In the field of warehousing and logistics, a mobile robot with multiple carrying devices takes the place of manual sorting in a pre-defined work area. Since the mobile robot of the present application is suitable for the scenario of flexible floor-standing sorting and plays the role of sorting robot, the mobile robot is often referred to as a "sorting robot with multiple carrying devices", or simply "sorting robot".

In the present disclosure, the term "a" or "an" should be understood as "at least one" or "one or more". In other words, "an" element refers to one element in one embodiment while multiple elements in other embodiments. The term "a" or "an" is not to be construed as limiting the quantity.

Although ordinal terms such as "first", "second", etc. will be used to describe various components, those components are not limited herein. Such a term is only used to distinguish one component from another. For example, a first component could be termed a second component, and as such, a second component could also be referred to as a first component without departing from the teachings of the present disclosure. The term "and/or" used herein includes any and all combinations of one or more of the listed relevant items.

The terminology used herein is for the purpose of describing the various embodiments and is not meant to be restrictive. As used herein, unless otherwise indicated expressly in the context, the singular forms include the plural forms. In addition, it is to be understood that the terms "comprising" and/or "having", when used in this specification, specify the presence of stated features, numbers, steps, operations, components, elements, or combinations thereof, and do not preclude the presence or additional of one or more other features, numbers, steps, operations, components, elements, or combinations thereof.

The terms used herein, including technical and scientific terms, unless being defined differently, have the same meaning as the terms commonly understood by those skilled in the art. It should be understood that the terms defined in the commonly used dictionary have meanings consistent with those used in the related art.

What is claimed is:

1. A mobile robot comprising:
   a first carrying device configured to carry a first item identifiable with a first delivery destination having an associated first receiving container;
   a second carrying device configured to carry a second item identifiable with a second delivery destination having an associated second receiving container, wherein the second receiving container is a container closest to said first receiving container;
   a control device, wherein the control device is connected to a first driving device and a second driving device and is configured to control operation of the first driving device and the second driving device;
   the first driving device configured to drive, under control of the control device, the mobile robot to travel along a delivery path traveling to said first and second delivery destinations of the first item and the second item, respectively; and
   the second driving device, wherein the second driving device is connected to the first carrying device and the second carrying device and is configured to drive, under the control of the control device, the first carrying device to deliver the first item to said first receiving container and the second carrying device to deliver the second item to said second receiving container,
   wherein the second carrying device is configured to, upon said first carrying device receiving said first item with said identifiable first delivery destination and associated first receiving container, carry the second item with said identified second delivery destination and said associated second receiving container.

2. The mobile robot of claim 1, further comprising:
   a first sensor provided on the first carrying device and connected to the control device, wherein the first sensor is configured to detect placement of the first item on the first carrying device and transmit a detection result to the control device; and
   a second sensor provided on the second carrying device and connected to the control device, wherein the second sensor is configured to detect placement of the second item on the second carrying device and transmit a detection result to the control device.

3. The mobile robot according to claim 1, wherein:
each of the carrying devices is any one of a conveyor belt and a tray, and the carrying devices comprise at least one of the first carrying device and the second carrying device.

4. The mobile robot according to claim 1, further comprising a communication device connected to the control device, wherein:
the communication device is configured to receive the delivery path sent from a server and transmit the delivery path to the control device, wherein the delivery path matches the routings of the first item and the second item; and
the control device is configured to control operation of the first driving device by controlling the first driving device based on the delivery path and enabling the first driving device to drive the mobile robot to travel along the delivery path.

5. The mobile robot according to claim 4, wherein:
the communication device is further configured to receive a return path sent from the server after the mobile robot completes delivery of the items and transmit the return path to the control device; and
the control device is further configured to control the first drive device based on the return path and enables the first drive device to drive the mobile robot to return to a target sorting spot along the return path.

6. The mobile robot according to claim 5, wherein the target sorting spot is a sorting spot closest to the mobile robot or a sorting spot having a largest item delivery demand.

7. The mobile robot according to claim 1, wherein:
the first carrying device and the second carrying device are horizontally arranged or vertically arranged.

8. The mobile robot according to claim 7, wherein:
the first item and the second item are a same item, and the first carrying device and the second carrying device are arranged horizontally and configured to carry the same item cooperatively.

9. The mobile robot according to claim 7, wherein:
the first carrying device and the second carrying device are horizontally arranged on left and right, or horizontally arranged on front and back.

10. The mobile robot according to claim 1, further comprising a third carrying device configured to carry a third item, wherein:
the first driving device is configured to drive, under the control of the control device, the mobile robot to travel along a delivery path matching routings of the first item, the second item, and the third item; and
the second driving device is further connected to the third carrying device, and is further configured to drive, under the control of the control device, the third carrying device to deliver the third item.

11. The mobile robot according to claim 10, wherein the first carrying device, the second carrying device, and the third carrying device are sequentially arranged horizontally or vertically.

12. The mobile robot according to claim 10, wherein:
each of the carrying devices is any one of a conveyor belt and a tray, and the carrying devices comprise at least one of the first carrying device, the second carrying device, and the third carrying device.

13. The mobile robot according to claim 10, further comprising a communication device connected to the control device, wherein:
the communication device is configured to receive the delivery path sent from a server and transmit the delivery path to the control device, wherein the delivery path matches the routings of the first item, the second item and the third item; and
the control device is configured to control operation of the first driving device by controlling the first driving device based on the delivery path and enabling the first driving device to drive the mobile robot to travel along the delivery path.

14. The mobile robot of claim 10, further comprising:
a first sensor provided on the first carrying device and connected to the control device, wherein the first sensor is configured to detect placement of the first item on the first carrying device and transmit a detection result to the control device;
a second sensor provided on the second carrying device and connected to the control device, wherein the second sensor is configured to detect placement of the second item on the second carrying device and transmit a detection result to the control device; and
a third sensor provided on the third carrying device and connected to the control device, wherein the third sensor is configured to detect placement of the third item on the third carrying device and transmit a detection result to the control device.

15. The mobile robot according to claim 10, wherein the first item, the second item, and the third item are a same item, and the first carrying device, the second carrying device and the third carrying device are configured to carry the same item cooperatively.

16. The mobile robot according to claim 11, wherein the first item, the second item, and the third item are a same item, and the first carrying device, the second carrying device and the third carrying device are configured to carry the same item cooperatively.

17. The mobile robot according to claim 11, wherein:
the first carrying device, the second carrying device and the third carrying device are horizontally arranged on left and right, or horizontally arranged on front and back.

18. The mobile robot according to claim 10, further comprising a communication device connected to the control device, wherein:
the communication device is configured to receive the delivery path sent from a server and transmit the delivery path to the control device, wherein the delivery path matches the routings of the first item and the second item; and
the control device is configured to control operation of the first driving device by controlling the first driving device based on the delivery path and enabling the first driving device to drive the mobile robot to travel along the delivery path.

19. The mobile robot according to claim 18, wherein a target sorting spot is a sorting spot closest to the mobile robot or a sorting spot having a largest item delivery demand.

* * * * *